(12) United States Patent
Gillies et al.

(10) Patent No.: US 6,854,110 B2
(45) Date of Patent: Feb. 8, 2005

(54) SYSTEM AND METHOD FOR OBTAINING SCRATCH REGISTERS IN COMPUTER EXECUTABLE BINARIES

(75) Inventors: David M. Gillies, Bellevue, WA (US); Ronnie Chaiken, Woodinville, WA (US); Jiyang Liu, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 588 days.

(21) Appl. No.: 09/746,949

(22) Filed: Dec. 21, 2000

(65) Prior Publication Data

US 2002/0083425 A1 Jun. 27, 2002

(51) Int. Cl.[7] .................................................. G06F 9/45
(52) U.S. Cl. ........................ 717/159; 717/130; 717/131; 717/145; 717/153
(58) Field of Search ................................ 717/124–135, 717/141–147, 151–161; 714/34–39

(56) References Cited

U.S. PATENT DOCUMENTS 6,631,514 B1 * 10/2003 Le ............................. 717/137

OTHER PUBLICATIONS

IBM Technical Disclosure Bulletin, "Register Allocation", vol. 28, No. 10, pp.: 4506–4513, Mar. 1986.*
Aho et al., "Compilers Principles, Techniques, and Tools", Addison–Wesley, pp. 585–702, 1986.*
Kiyohara et al., "Register Connection: A New Approach to Adding Registers into Instruction Set Architechtures", IEEE, pp.: 247–256, 1993.*
Moudgill et al., "Register Renaming and Dynamic Speculation: an Alternative Approach", IEEE, pp.: 202–213, Dec. 1993.*
Srivastava et al., "ATOM A System for Building Customized Program Analysis Tools," *Proceedings of the ACM SIGPLAN '94 Conference on Programming Language Design and Implementation (PLDI)*, Orlando, Florida 1994, pp. 196–205.
Muchnick, "Control–Flow Analysis," *Advanced compiler design and implementation*, Morgan Kaufmann Publishers, Inc., San Francisco, California, 1997, pp. 169–191.
Lee et al., "Execution Characteristics of Desktop Applications on Windows NT," *Proceedings of the 25th Annual International Symposium on Computer Architecture* Barcelona, Spain, 1998, pp. 27–38.
Tamches et al., "Fine–Grained Dynamic Instrumentation of Commodity Operating System Kernels," *Proceedings of the Third Symposium on Operating Systems Design and Implementation*, New Orleans, Louisiana, 1999, pp. 117–130.

* cited by examiner

Primary Examiner—Antony Nguyen-Ba
Assistant Examiner—Ted T. Vo
(74) Attorney, Agent, or Firm—Merchant & Gould PC

(57) ABSTRACT

A system and method for obtaining scratch registers in a computer-executable binary is provided. Register allocation requests in a computer-executable binary are discovered. In one method, the register allocations are examined procedure-by-procedure. The maximum number of registers requested by any instruction in the procedure is discovered. Then, register requests in the procedure are modified to request the maximum number discovered plus a number of scratch registers. In another method, the register allocations are examined block-by block within a procedure. Dominating register allocations for each block are found. Then the dominating register allocations are modified to request scratch registers.

14 Claims, 10 Drawing Sheets

SYSTEM AND METHOD FOR OBTAINING SCRATCH REGISTERS IN COMPUTER EXECUTABLE BINARIES

FIELD OF THE INVENTION

The present invention relates generally to computer-executable software, and more particularly to instrumenting computer-executable binaries.

BACKGROUND

After source code for a software application has been compiled, post-link tools typically insert binary code to profile, optimize, or otherwise instrument the software application. Generally, the code inserted requires the use of at least one register. At the point where code is inserted, however, it is not, in general, easy to determine if a register is already in use in the software application. Using a register already in use destroys the value in the register and almost always changes a program's behavior or output values. As processors become more complicated, determining a free register becomes even more difficult.

In some older processors, the data in a register could be stored in memory and retrieved later. With some newer processors, however, storing register data in memory may require additional processing. For example, some processors speculate on program flow and start executing instructions they predict the program will execute next. During speculative execution, a processor may find an instruction that attempts to store register data in an invalid location. Mechanisms within the processor detect and stop the attempt and flag the register as containing invalid data. A further attempt to store the register data in memory without clearing the flag results in a hardware fault. Thus, in such processors, a program cannot, in general, simply save register data to memory, use the register as a scratch register, and then retrieve the original register data from memory without first determining if the flag is set. Unfortunately, an instrumented program cannot, in general, test if a flag is set without using (and overwriting the contents of) at least one register.

SUMMARY

The present invention provides a system and method for instrumenting binaries for hardware architectures which may generate a hardware fault when an attempt to store register data in memory is made. One such architecture, for example, is the Intel Architecture 64 (IA-64) whose first implementation is Intel's ITANIUM processor. In accordance with a brief statement of the invention, binaries are analyzed to find register allocations. Then calculations are performed to determine modifications for each register allocation to provide for scratch registers. Those modifications are then applied to each register allocation resulting in a number of extra register allocations. The extra registers allocated may then be used as scratch registers.

In one aspect of the invention, an analysis of register allocation is performed on a block-by-block basis within each procedure. For example, a first basic block may follow two or more other basic blocks. The two or more other basic blocks may each allocate different numbers of registers. This could happen, for example, if the first basic block followed a conditional statement in which one of the branches of the condition allocated a first number of registers and another branch of the condition allocated a second number of registers. To ensure that scratch registers are available in the first basic block, the two or more other basic blocks may be modified to account for the possibility of either path being taken during execution. Specifically, a maximum number of registers requested in any branch is discovered. Then, register allocations within each branch are modified to request this maximum number plus a number of extra registers that may then be used as scratch registers.

In another aspect of the invention, each procedure, wherein a procedure may include multiple basic blocks, is scanned to identify register allocations. For each procedure, a maximum number of registers requested by identified register allocations within the procedure is calculated. Then, at least one register allocation within the procedure is modified to request the maximum number plus a number of extra scratch registers.

There are several advantages to the present invention. It provides a method for instrumenting binaries on architectures which may generate a hardware fault for an attempt to improperly store a register. This allows developers to instrument binary code for which they do not have the source code. Instrumenting code aids in optimizing the code. The invention also provides a method for maintaining the same index(es) for scratch register(s) throughout a procedure. It also provides a low computational method for determining how the allocations in a procedure may be modified to provide scratch registers throughout the procedure.

DETAILED DESCRIPTION

The present invention provides a method for obtaining scratch registers in binaries. Among other things, disclosed are two methods for obtaining scratch registers in a binary executable. In one method, dominating allocation information is used to obtain scratch registers. In another method, information about allocations throughout a procedure is used to obtain scratch registers. Prior to describing the invention in greater detail, a list of some terms and their definitions is provided below.

Definition of Terms

Figure 5A:
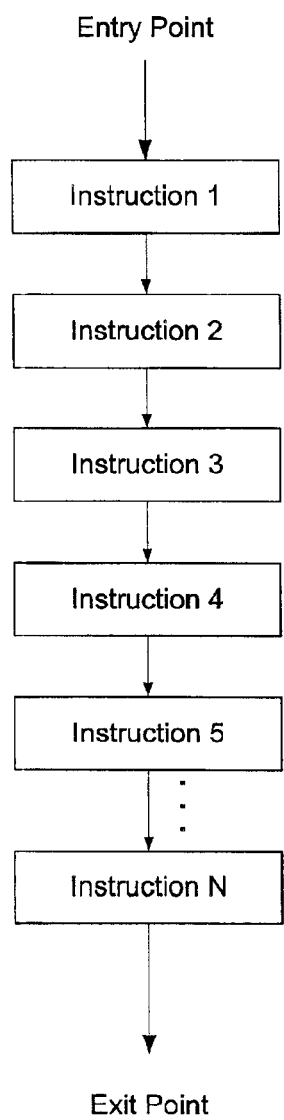
FIG. 5A is a diagram showing program execution used in defining a basic block, according to one embodiment of the invention.
Figure 5B:
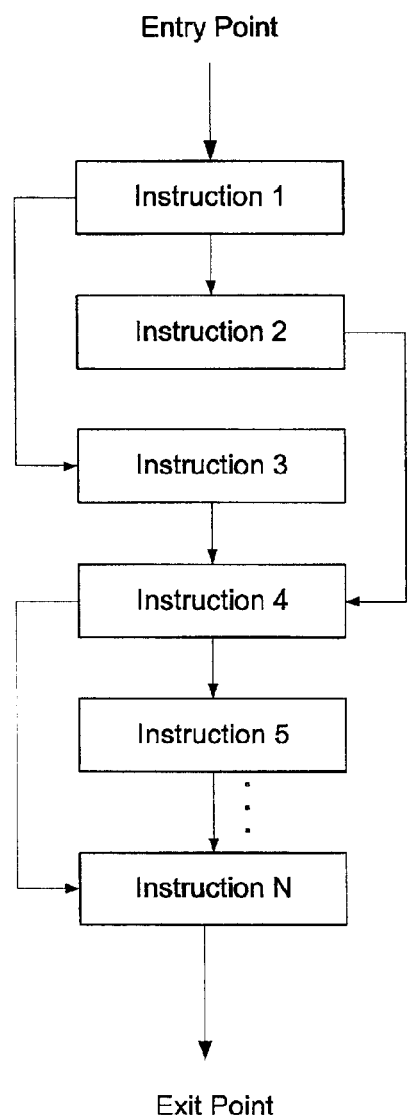
FIG. 5B is a diagram showing program execution used in defining a basic block, according to one embodiment of the invention.

Basic Block—A sequence of instructions having one entry point and one exit point wherein if the first instruction in the sequence is executed, the other instructions in that sequence will also be executed. A distinction between a basic block and a non-basic block is shown in FIGS. 5A and 5B. FIG. 5A shows a basic block. Once a program begins executing Instruction 1, it will continue executing the rest of the instructions in the sequence until Instruction N. FIG. 5B shows a non-basic block. A program executing Instruction 1 will not necessarily subsequently execute all instructions between Instruction 1 and Instruction N. Specifically, a program executing Instruction 1 may execute Instruction 2, Instruction 4 and Instruction N without executing the other instructions.

Note, however, that a program executing the first instruction of a basic block may execute intervening instructions between the first instruction in the basic block and the last instruction in the basic block. This may occur, for example, if an interrupt causes the program to execute other code or if a multitasking processor gives a time slice to another thread or process. But, once a basic block is entered, all the instructions in the basic block will be executed provided that the program operates normally and enough time to complete the instructions is provided.

Figure 6:
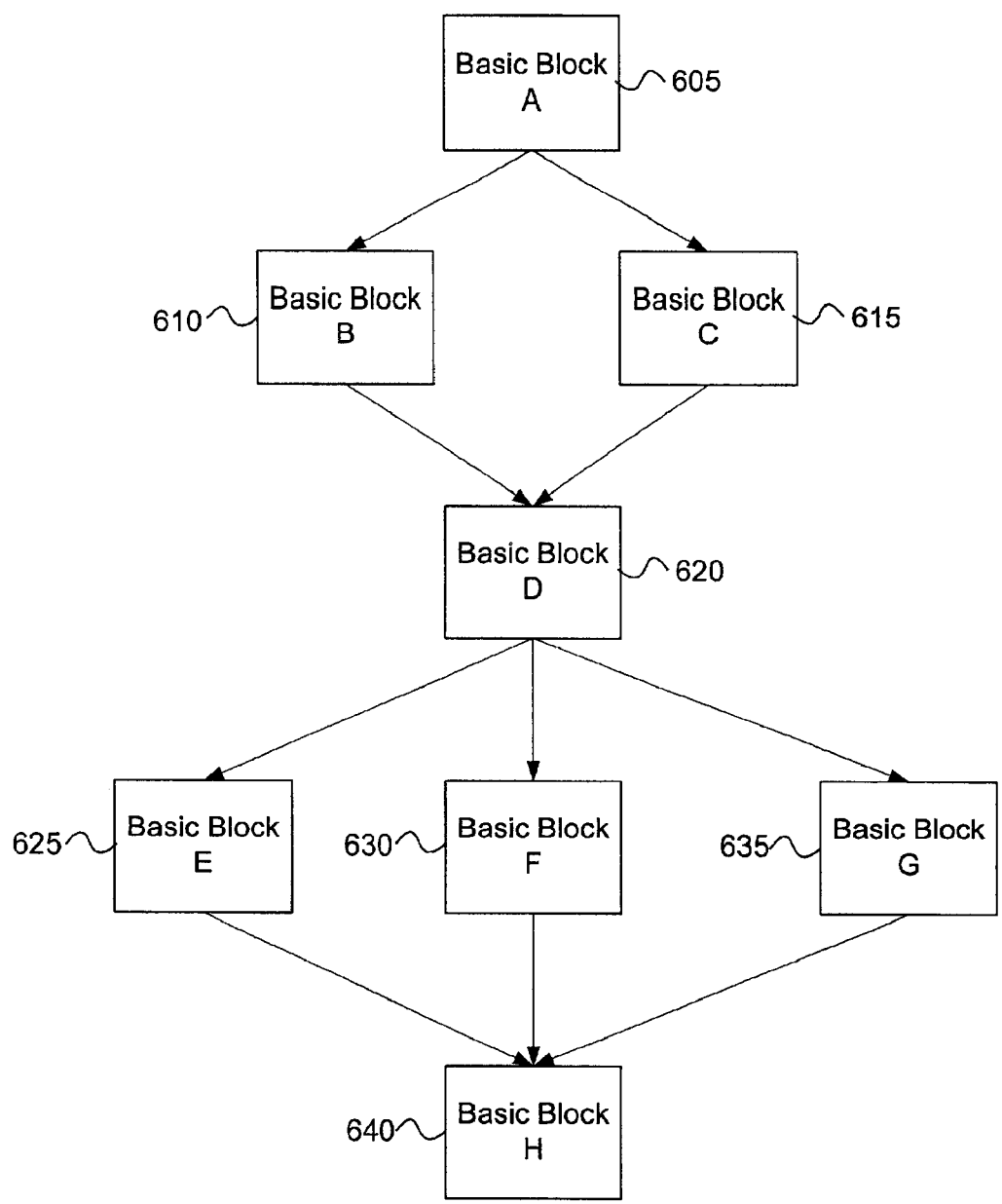
FIG. 6 is a diagram showing program execution used in defining a control flow diagram, according to one embodiment of the invention.

Control flow graph (CFG)—A graph of basic blocks that a program may potentially execute. FIG. 6 shows an example of a CFG. In FIG. 6, a program entering basic block A 605 will execute basic block A 605 and then either basic block B 610 or basic block C 615. A program would exhibit this behavior, for example, upon executing a two-possibilities conditional statement. After executing either basic block B 610 or basic block C 615, the program will execute basic block D 620. After executing basic block D 620, the program will execute basic block E 625, basic block F 630, or basic block G 635. Such execution could occur, for example, if the program executed a three-possibilities conditional statement after basic block D 620. After executing basic block E 625, basic block F 630, or basic block G 635, the program executes basic block H 640.

Figure 7:
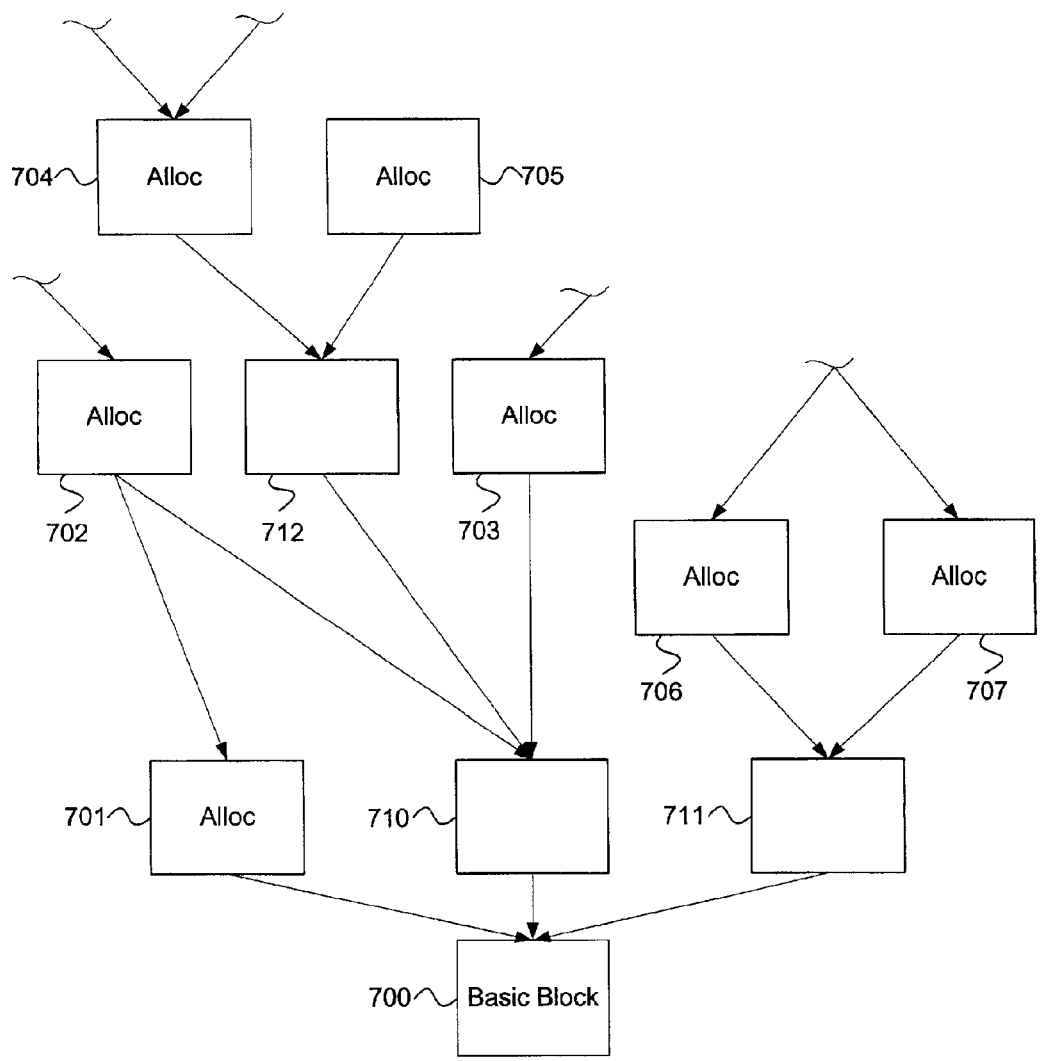
FIG. 7 is a diagram showing program execution used in defining a dominating allocation, according to one embodiment of the invention.

Dominating allocation(s)—The most recent allocation or set of allocations a program may encounter before the current basic block. FIG. 7 shows a CFG preceding basic block 700. Each of blocks 701 through 707 and 710 through 712 are also basic blocks. Other portions of the CFG prior to basic block 700 and not shown in FIG. 7 are indicated by curved lines. The set of allocations in basic blocks 701 through 707 jointly dominate the first instruction of basic block 700. Basic blocks 710 through 712 do not contain an allocation and therefore do not contribute to the jointly dominating allocation set. If, for example, basic block 711 had an allocation, basic blocks 706 and 707 would cease to be part of the jointly dominating allocations for basic block 700, and basic block 711 would become part of the jointly dominating allocations for basic block 700.

Note that basic block 702 is one of the dominating allocations for basic block 700, even though a program executing basic block 702 and then basic block 701 before executing basic block 700 would find a more recent allocation in basic block 701. Basic block 702 still contains a dominating allocation because a program executing the CFG of FIG. 7 may execute basic block 702 followed by basic block 710 followed by basic block 700, thus bypassing basic block 701. Thus, the allocation in basic block 702, in this case, would be the most recent allocation the program encountered before entering basic block 700.

If basic block 700 contained a single allocation, the allocation would constitute the dominating allocation for any instructions in basic block 700 which followed the allocation. Allocations in basic blocks higher in the hierarchy of the CFG of FIG. 7 and not shown do not contain dominating allocations for basic block 700 because a more recent basic block containing an allocation is encountered by a program executing basic block 700.

In light of this disclosure and the definitions above, it will be recognized by those skilled in the art that many methods may be used to discover basic blocks, build control flow diagrams, and find dominating allocations. Some example techniques include recursive, non-recursive, parallel, non-parallel, sequential, divide and conquer, breadth first, depth first, and other algorithms. Embodiments of the invention are not limited by the technique used and may use any technique which gathers or constructs the above information.

Illustrative Operating Environment

Figure 1:
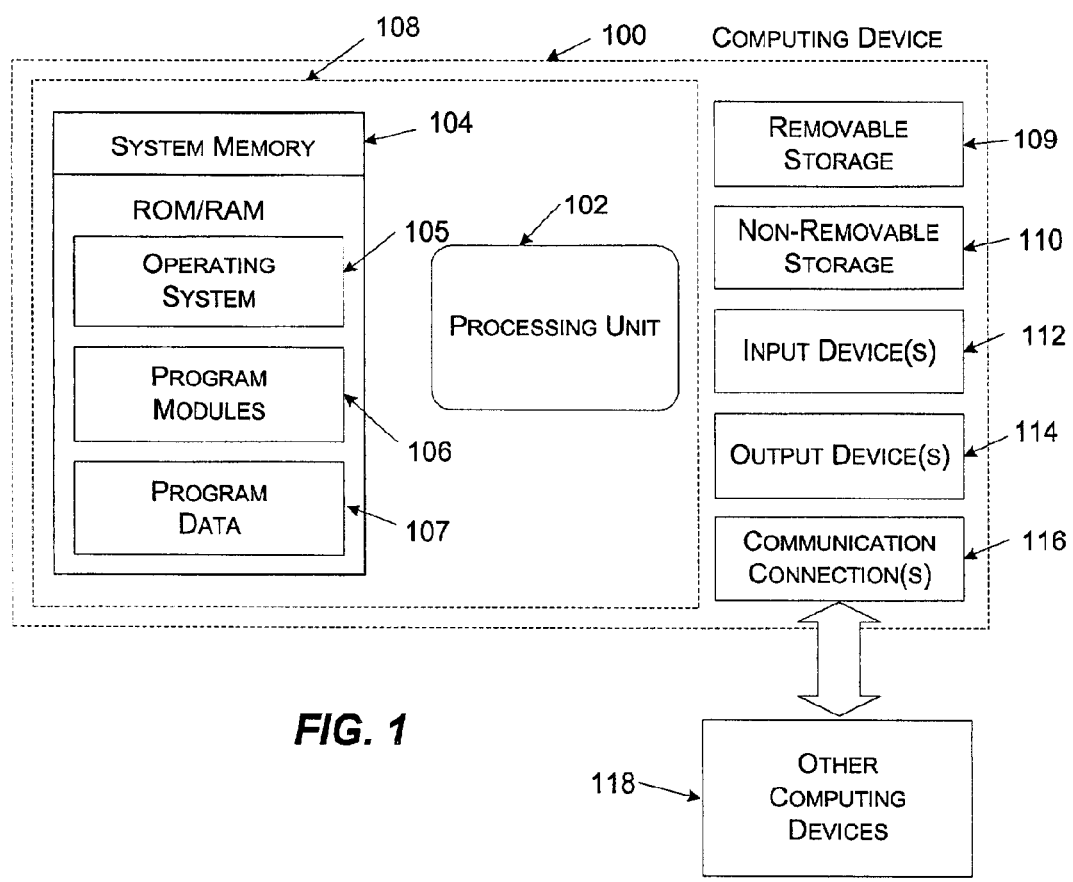
FIG. 1 is a functional block diagram of one computing device adapted to implement one embodiment of the invention.

With reference to FIG. 1, an exemplary system for implementing the invention includes a computing device, such as computing device 100. In a very basic configuration, computing device 100 typically includes at least one processing unit 102 and system memory 104. Processing unit 102 includes existing physical processors, those in design, multiple processors acting together, virtual processors, and any other device or software program capable of interpreting binary executable instructions. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. This basic configuration is illustrated in FIG. 1 by those components within dashed line 108.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. All these devices are known in the art and need not be discussed at length here.

Computing device 100 may also contain communications connection(s) 116 that allow the device to communicate with other computing devices 118, such as over a network. Communications connection(s) 116 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Illustrative Scratch Register Allocation System

Figure 2:
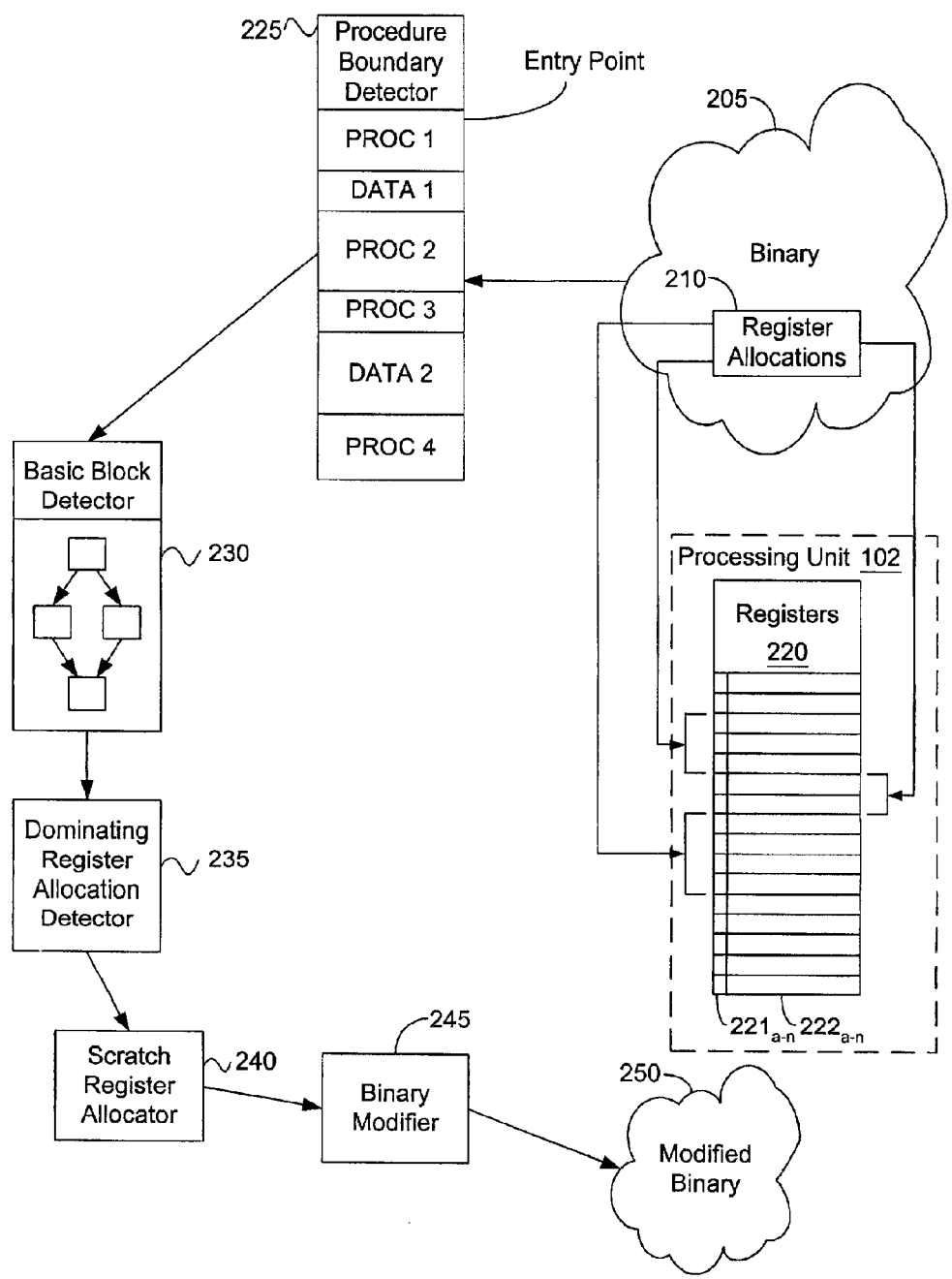
FIG. 2 is a functional block diagram illustrating a system adapted to modify a binary executable to provide for scratch registers, according to another embodiment of the invention.

FIG. 2 is a functional block diagram illustrating a system adapted to modify a binary executable to provide for scratch registers, according to one embodiment of the invention. This embodiment of the invention includes processing unit 102 having registers 220, binary executable 205 including register allocation instructions 210, procedure boundary detector 225, basic block detector 230, dominating register allocation detector 235, scratch register allocator 240, binary modifier 245, and modified binary executable 250.

Processing unit 102 operates as described in conjunction with FIG. 1. In this embodiment of the invention, each register of registers 220 has a data area $222_{a-n}$ and a flag area $221_{a-n}$. Flag area $221_{a-n}$ of each register indicates, among other things, whether the associated register can be stored in main memory without generating a hardware fault. A register configuration similar to the one shown in registers 220 may be used, for example, on processors that perform speculative stores. Such processors typically speculate as to program execution in order to speed program execution.

Sometimes, if a speculative store is carried out, a hardware fault may occur. In other words, at times an attempt to store register data in RAM causes a hardware fault. A hardware fault may occur for a variety of reasons. One example of when a hardware fault may occur is when a program attempts to write outside its memory space. Another example is when a program attempts to write to an invalid memory location, e.g. a memory address for memory that does not exist. Yet another example of when a hardware fault may occur is when a program attempts an undefined operation, such as division by zero.

Instead of causing a hardware fault, some processors set a flag indicating that a hardware fault will occur if register data is saved to a particular memory address as indicated by speculation of a program's execution path. Architectures built on such processors then let the program determine what to do if and when the instruction is reached. A program might, for example, not even reach the store command because the speculation is incorrect as to which instructions the program would execute. Other programs may have logic errors which cause a hardware fault, e.g., the hardware speculation is correct in its prediction of program behavior but the program was written incorrectly. Other programs may check the status flag associated with the register to be stored in memory and determine that a hardware fault would occur and then activate a debugging or logging mechanism or take other corrective action.

Processing unit 102 receives register requests from binary executable 205. Where possible, processing unit 102 allocates registers according to the requests received. It may not be possible, for example, for processing unit 102 to allocate more registers than physically exist.

Register allocations 210 in binary executable 205 relate to instructions in binary executable 205 that request register allocations. Such allocations typically occur throughout binary executable 205 and are not generally confined to one location.

Procedure boundary detector 225 analyzes binary executable 205 to find procedure and data boundaries. Before a program is compiled, procedure boundaries are readily discernable. This is because before compilation, a program is typically written in a human-readable programming language often called source code. Source code includes human-readable software constructs or delimiters that indicate when a procedure begins and ends. After source code is compiled into a binary executable, however, procedure boundaries are more difficult to determine. This is partially because a binary executable is a machine-readable language typically constructed from sequential ones and zeros. Comments, variable names, formatting, and other human aids contained in source code are typically removed when a program is compiled. Detecting procedure boundaries in a binary executable, therefore, is generally much more difficult than determining procedure boundaries in source code. Often, those trying to detect procedure boundaries in a binary executable use software tools. A procedure boundary detector tool for binaries named VULCAN is produced by Microsoft Corporation of Redmond, Wash.

Basic block detector 230 is configured to receive the procedure and boundary information produced by procedure boundary detector 225. Basic block detector 230 generates basic blocks and a CFG based on the information received. It then sends the basic blocks and CFG information to dominating register allocation detector 235.

Dominating register allocation detector 235 is configured to receive the CFG and related information from basic block detector 230. After dominating register allocation detector 235 receives the CFG, it discovers dominating allocations for each basic block in the CFG. Dominating register allocation detector 235 then passes this information to scratch register allocator 240.

Scratch register allocator 240 is configured to receive dominating register allocation information from dominating register allocation detector 235. It then computes information related to changing register allocations in binary executable 205 to provide for scratch registers. Computing the register-allocation change information is described in detail below in conjunction with FIG. 10. This information is then passed to binary modifier 245.

Binary modifier 245 is configured to receive the register allocation modification information from scratch register allocator 240. Binary modifier 245 uses this information to modify binary executable 205 to achieve modified binary 250. Modified binary executable 250 includes the changes binary modifier 245 makes to binary executable 205. Modified binary executable 250 may be stored in RAM, on disk, or in some other suitable computer readable memory. Binary modifier 245 may also use information related to procedure and data boundaries discovered by procedure boundary detector 225 to make changes to binary executable 205.

Because scratch registers are available, binary modifier 245 may also make other instrumenting code changes to binary executable 205 that may otherwise not be possible without the risk of affecting binary executable 205's behavior. For example, code may be inserted into binary executable 205 to allow a debugger to step through code in modified binary 250. Alternatively, binary executable 205 may be instrumented for profiling purposes. For example, a software developer may desire to determine how long it takes for binary executable 205 to execute certain procedures or how many times certain procedures are called. These and other changes may be made by binary modifier 245 to instrument binary executable 205 as desired.

Figure 3:
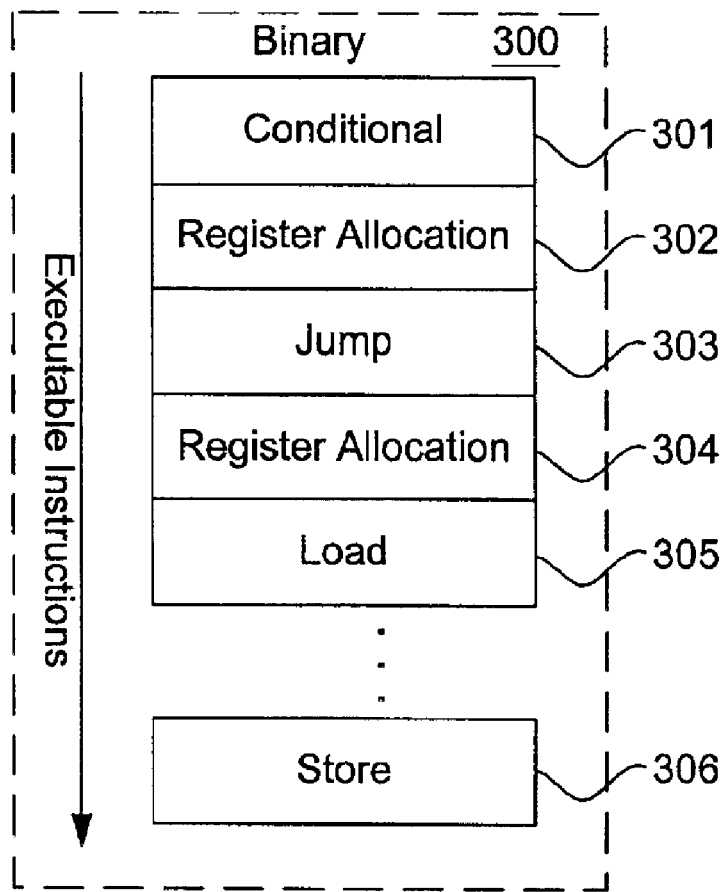
FIG. 3 illustrates instructions contained in a binary executable, according to one embodiment of the invention.

FIG. 3 illustrates instructions contained in a binary executable, according to one embodiment of the invention. Instructions 301 through 306 in FIG. 3 are for illustrative purposes only. The instructions contained in binary executable 300 could contain any sequence of instructions executable on a processor.

Instruction 305 may be reached from many different instructions in binary executable 300. Suppose, for example, that it could be reached from instruction 303 and instruction 304. Also assume, that these are the only instructions that could immediately precede instruction 305. Then, a scratch register allocation system such as that described in FIG. 2 should discover that the register allocation in instruction 302 and the register allocation in instruction 304 are dominating allocations for instruction 305. Furthermore, to obtain scratch registers in binary executable 300 for instruction 305, both of these dominating allocations should be modified to provide additional registers to be used for scratch registers.

Alternative Illustrative Scratch Register Allocation System

Figure 4:
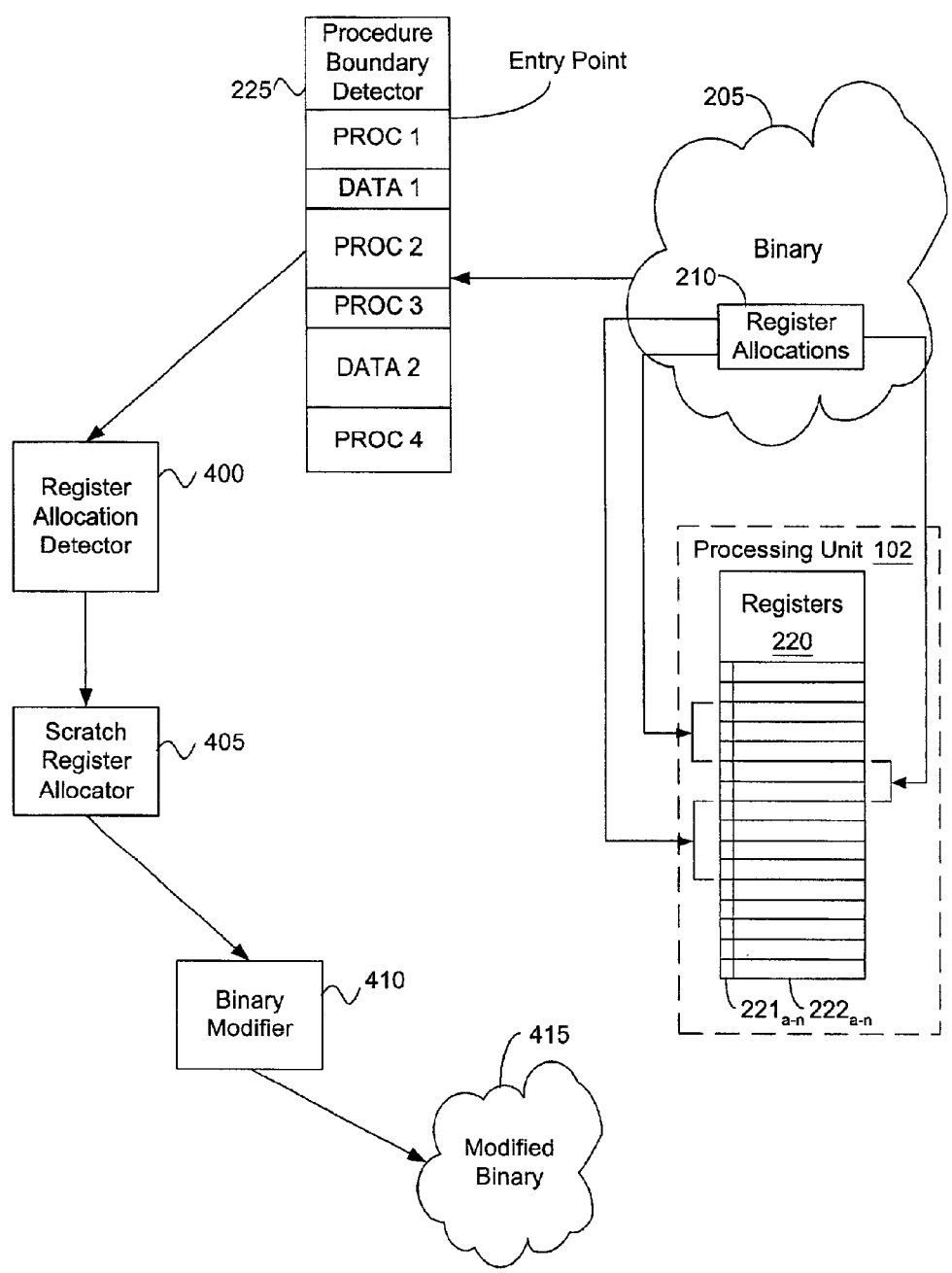
FIG. 4 is a functional block diagram illustrating a system adapted to modify a binary executable to provide for scratch registers, according to an embodiment of the invention.

FIG. 4 is a functional block diagram illustrating a system adapted to modify a binary executable to provide for scratch registers, according to an embodiment of the invention. This embodiment of the invention includes processing unit 102 having registers 220, binary executable 205 including register allocation instructions 210, procedure boundary detector 225, register allocation detector 400, scratch register allocator 405, binary modifier 410, and modified binary executable 415. Registers 220 have a data area $222_{a-n}$ and a flag area $221_{a-n}$.

Briefly stated, the system illustrated in FIG. 4 focuses on a procedure-by-procedure analysis to discover and modify register allocations whereas the system illustrated in FIG. 2 focuses on a block-by-block analysis of a procedure to discover and modify register allocations. Some of the differences between the systems in FIG. 2 and FIG. 4 relate to the detection of basic blocks, the construction of control flow diagrams, and the detection of dominating register allocations. Registers 220, flag area $221_{a-n}$, data area $222_{a-n}$, register allocation instructions 210, binary executable 205, and procedure boundary detector 225 operate as described in conjunction with FIG. 2. Those components will not be discussed more here.

Register allocation detector 400 is configured to receive information from procedure boundary detector 225. After it receives information, register allocation detector 400 identifies register allocations in each procedure discovered by procedure boundary detector 225. It then passes the locations of the register allocations it discovers and other data, including information discovered by procedure boundary detector 225, to scratch register allocator 405.

Scratch register allocator 405 is configured to receive data from register allocation detector 400. Scratch register allocator 405 looks at register allocations on a procedure-by-procedure basis. For each procedure, scratch register allocator 405 determines how to modify register allocations within the procedure to provide for scratch registers. Scratch register allocator 405 outputs this information and other received information to binary modifier 410.

Binary modifier 410 is configured to receive scratch register information and other information from scratch register allocator 405. Based on the information received, binary modifier 410 modifies binary executable 205 to provide for scratch registers.

Binary modifier 410 may also make other instrumenting code changes to binary executable 205 similar to those made by binary modifier 245 as discussed in conjunction with FIG. 2. After making changes to binary executable 205, binary modifier 410 outputs modified binary executable 415, which may then be used for purposes including those discussed for modified binary executable 250 as described in conjunction with FIG. 2.

Illustrative Scratch Register Allocation Methods

Figure 8:
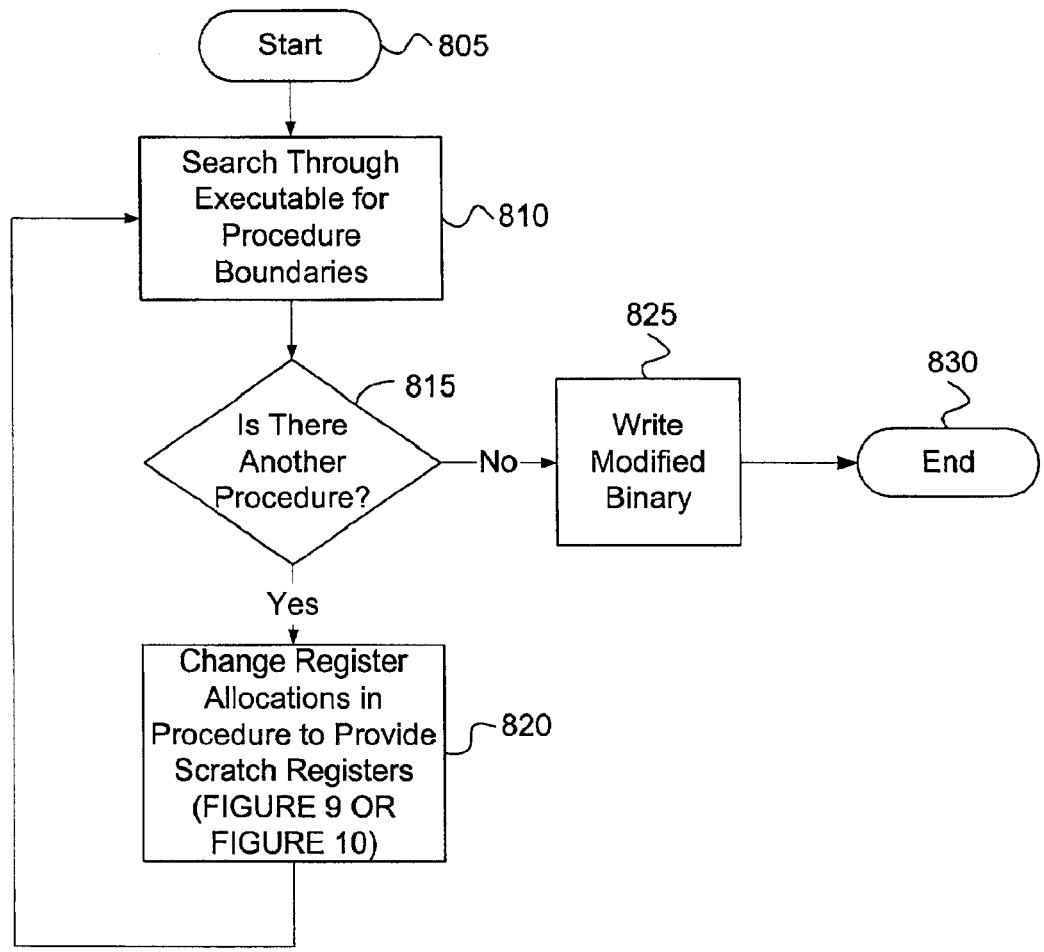
FIG. 8 is a logical flow diagram illustrating a process for providing scratch registers in a binary executable, according to one embodiment of the invention.

FIG. 8 is a logical flow diagram illustrating a process for providing scratch registers in a binary executable, according to one embodiment of the invention. The process illustrated in FIG. 8 may be used to provide scratch registers for systems illustrated in FIG. 2 and FIG. 4. The process begins at block 805 after a binary executable is selected for register allocation modification to provide for scratch registers.

At block 810, a search is conducted to identify a procedure boundary, if any, in the selected binary executable. A tool like VULCAN may be used to find procedure boundaries. For example, referring to FIG. 4, procedure boundary detector 225 identifies a procedure boundary in binary executable 205.

In block 815, a determination is made as to whether another procedure boundary was found. If so, processing continues at block 820. Otherwise, the procedure boundaries have been found and processing continues at block 825. For example, referring to FIG. 4, procedure boundary detector 225 determines when the procedure boundaries in binary executable 205 are identified.

At block 820, register allocations within the identified procedure are modified to provide scratch registers. In one embodiment, procedure allocation modification takes place at a procedural level as described in more detail in conjunction with FIG. 9. For example, referring to FIG. 4, scratch register allocator 405 changes register allocations on a procedure-by-procedure basis. In another embodiment, register allocation modification takes place at a block level, wherein a CFG is constructed and each block is analyzed for a dominating allocation or allocations. This is described in more detail in conjunction with FIG. 10. For example, referring to FIG. 2, scratch register allocator 240 changes register allocations on a block-by-block basis.

At block 825, where the search for additional procedure boundaries is complete, a modified binary executable is written to a file or alternatively to memory. The modified binary executable file now has scratch register allocations and may include other instrumentation code. For example, referring to FIG. 4, binary modifier 410 writes modified binary executable 415.

At block 830, processing ends. Modified binary executable 415 may now be executed.

In both of the above embodiments, processing to provide scratch register typically occurs after procedure boundaries are discovered. This is because some processors store registers in use by a procedure before calling another procedure. This gives the new procedure a "fresh" set of registers to allocate. In other words, when a fresh set of registers is provided to each procedure, once a procedure is identified, a search for a dominating allocation or allocations need only continue at most to the beginning of a procedure.

In other register allocation schemes, this may not be the case. In those schemes, embodiments of the invention may not necessarily proceed on a procedure-by-procedure basis. One embodiment, for example, proceeds by constructing a CFG for each procedure in the entire binary executable and then analyzing each basic block to determine the dominating allocation or allocations.

Figure 9:
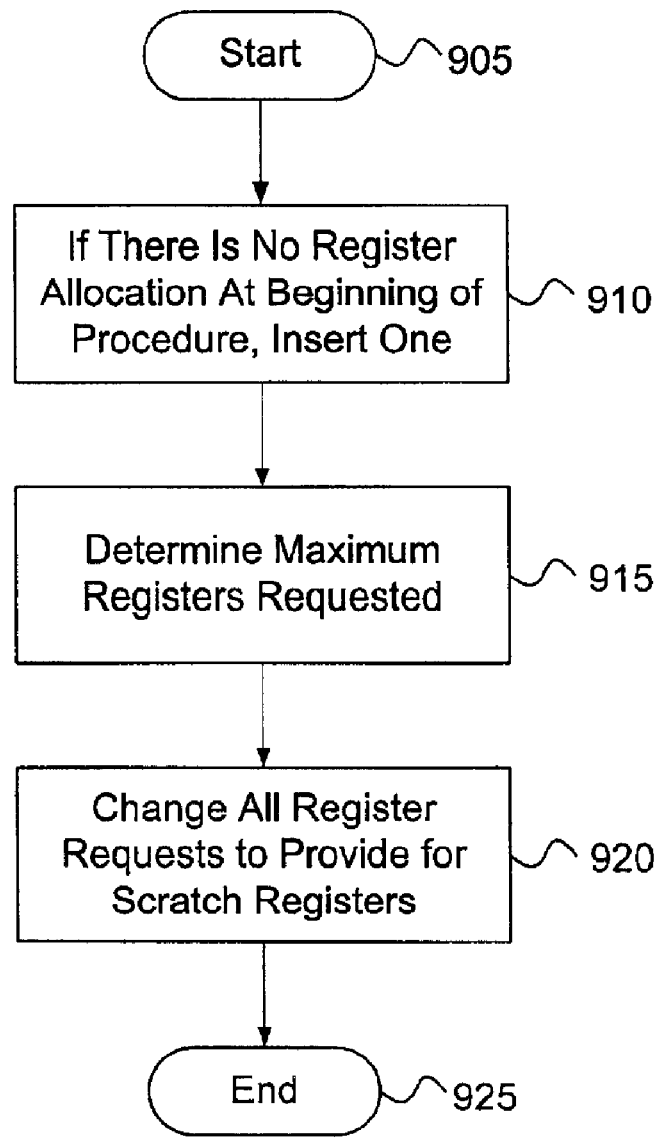
FIG. 9 is a logical flow diagram illustrating a process for allocating scratch registers on a procedure-by-procedure basis according to one embodiment of the invention.

FIG. 9 is a logical flow diagram illustrating a process for allocating scratch registers on a procedure-by-procedure basis, according to one embodiment of the invention, such as may be employed in block 820 of the process illustrated in FIG. 8. The process begins at block 905 after a procedure has been identified.

At block 910, the first instruction of the procedure is examined to determine if it includes a register allocation. Some software compilers assume an implicit register allocation as the first instruction of a procedure if an explicit first instruction allocation does not exists. Additionally, if a software developer has no special register allocation needs for a particular procedure, the software developer may forego explicitly requesting registers.

Continuing at block 910, if the first instruction of the procedure has an implicit register allocation, the register allocation is made explicit. For example, referring to FIG. 4, register allocation detector 400 inserts an explicit register allocation, if needed, at the beginning of each procedure it evaluates.

At block 915, the maximum number of registers requested by any of the register requests within the procedure is determined. For example, referring to FIG. 4, scratch register allocator 405 determines the maximum number of registers requested by any of the register allocations in the procedure.

At block 920, all register requests in the procedure are changed to include the maximum number found above plus a number of scratch registers. For example, referring to FIG. 4, scratch register allocator 405 modifies the register allocations found by register allocation detector 400 to provide for the additional number of scratch registers.

At block 925, processing ends. At this point, allocations within a procedure have been modified to provide for scratch registers on a procedure-by-procedure basis.

The method outlined above has several advantages. One advantage is that it does not require involved analysis. A linear search for a maximum register allocation is performed on a procedure-by-procedure basis. Then, a linear replacement is performed to provide scratch registers.

Another advantage is that the scratch registers provided may be referenced using the same indexes throughout the procedure. For example, assume that a procedure has one register allocation that allocates 3 registers and one register allocation that allocates 4 registers. Also assume that 3 scratch registers are desired. The method above would determine that the maximum number of registers requested by any register allocation is 4. Then, both register allocations would be modified to request 7 registers (4 regular registers+3 scratch registers). After both modified allocations, registers 5–7 could be used as scratch registers. Thus profiling or instrumentation code inserted would not need to calculate a new scratch register index after each allocation; rather it could simply use registers 5–7. This simplifies inserting instrumenting code.

Note that the register allocation that originally requested 3 registers would have another free register that could be used as a scratch register, namely, register 4, but this register is not needed to obtain the 3 scratch registers desired and could go unused.

Figure 10:
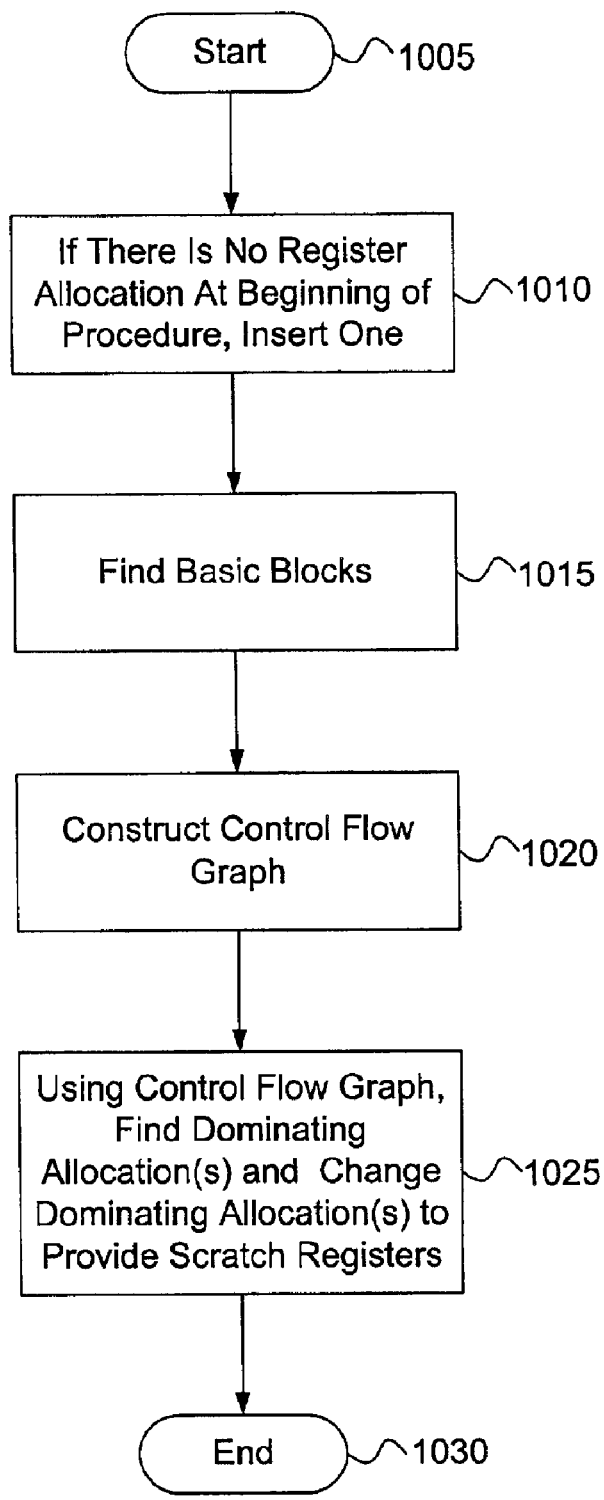
FIG. 10 is a logical flow diagram illustrating a process for allocating scratch registers on a block-by-block basis, according to another embodiment of the invention.

FIG. 10 is a logical flow diagram illustrating a process for allocating scratch registers on a block-by-block basis, according to one embodiment of the invention, such as may be alternatively employed in block 820 of the process illustrated in FIG. 8. The process begins at block 1005 after a procedure has been identified.

At block 1010, the first instruction of the procedure is examined to determine if it includes register allocation. If the first instruction of the procedure has an implicit register allocation, the register allocation is made explicit. For example, referring to FIG. 2, dominating register allocation detector 235 inserts an explicit register allocation, if needed, at the beginning of each procedure it evaluates.

At block 1015, basic blocks within the procedure are discovered. For example, referring to FIG. 2, basic block detector 230 discovers basic blocks contained in the procedure identified by procedure boundary detector 225.

At block 1020, a CFG for the procedure is constructed using the basic blocks discovered above. For example, referring to FIG. 2, basic block detector 230 uses the basic blocks it discovered and program flow information contained in the procedure to construct a CFG.

At block 1025, the CFG is used to find a dominating allocation or allocations. Then, for each block, each allocation dominating the block is changed to provide for scratch registers. For example, assume two dominating allocations are found for a basic block and that one of the domination allocations request 3 registers and the other dominating allocation requests 4 registers. Also assume that 3 scratch registers are desired. To provide 3 scratch registers in the basic block, each dominating allocation should be changed to request the maximum number of registers requested by a dominating allocation (4 in this example) plus the number of desired scratch registers (3 in this example). Then, no matter which dominating allocation immediately proceeded the block, 3 scratch registers would be available upon entry into the block.

For example, referring to FIG. 2, dominating register allocation detector 235 uses the CFG created by basic block detector 230 to discover the dominating allocations in each basic block found by basic block detector 230. Then, scratch register allocator 240, uses the domination allocation information discovered by dominating register allocation detector 235 to modify each dominating allocation discovered to provide for scratch registers.

Processing continues to block 1030 and ends. At this point, scratch registers are available throughout the procedure and may be used by instrumenting code.

The various embodiments of the invention are implemented as a sequence of computer implemented steps or program modules running on a computing system and/or as interconnected machine logic circuits or circuit modules within the computing system. The implementation is a matter of choice dependent on the performance requirements of the computing system implementing the invention. In light of this disclosure, it will be recognized by one skilled in the art that the functions and operation of the various embodiments disclosed may be implemented in software, in firmware, in special purpose digital logic, or any combination thereof without deviating from the spirit and scope of the present invention as recited within the claims attached hereto.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for obtaining scratch registers for use by a procedure in a computer-executable binary, comprising:

identifying a maximum number of registers requested by the procedure;

identifying an additional number of scratch registers for use by the procedure;

generating a number of registers by adding the maximum number of registers and the additional number of scratch registers;

modifying the computer-executable binary to request the number of registers; and requesting the number of registers.

2. The method of claim 1, wherein each of the scratch registers is indexed by an index that remains constant throughout the procedure.

3. The method of claim 1, wherein the number of requested registers is used for supporting instrumentation code in the computer-executable binary.

4. The method of claim 1, wherein the computer-executable binary is constructed for execution on a processor configured to execute a speculative instruction.

5. The method of claim 4, wherein data is stored in a register in association with the speculative instruction, and wherein moving the data to a main memory results in a hardware fault.

6. A computer system, comprising:

a computer-executable binary;

a procedure boundary detector configured to identify a procedure of the computer-executable binary; and a scratch register allocator that is configured to:
   receive the identified procedure from the procedure boundary detector; and
   modify the computer-executable binary to request a maximum number of registers associated with the procedure and a number of scratch registers used by the procedure.

7. The system of claim 6, wherein the computer-executable binary comprises at least one register allocation request.

8. The system of claim 7, wherein the scratch register allocator provides at least one scratch register by modifying the at least one register allocation request.

9. The system of claim 6, further comprising:

a basic block detector configured to receive the identified procedure from the procedure boundary detector and to identify at least one basic block in the identified procedure; and a dominating register allocation detector configured to receive the at least one basic block and to detect at least one dominating allocation for the at least one basic block, wherein the scratch register allocator is further configured to receive the at least one basic block identified and the at least one dominating allocation detected.

10. The system of claim 9, wherein the basic block detector is further configured to construct a control flow graph using the at least one basic block identified.

11. The system of claim 10, wherein the scratch register allocator is further configured to receive the control flow graph.

12. A computer-readable medium having computer-executable instructions, comprising:

identifying a procedure in the computer-executable instructions, wherein the procedure includes at least one register request, and wherein the procedure uses a number of scratch registers;

determining a maximum number of requested registers in the procedure; and requesting the maximum number of requested registers plus the number of scratch registers used by the procedure.

13. The method of claim 12, further comprising:

for a basic block in the procedure:
   finding at least one dominating allocation; and
   modifying the at least one dominating allocation to request the number of scratch registers.

14. The method of claim 12, further comprising:

finding at least one basic block in the procedure;

constructing a control flow graph from the at least one basic block;

using the control flow graph to discover at least one dominating allocation; and modifying the at least one dominating allocation to request the number of scratch registers.

* * * * *